Oct. 4, 1966   R. B. ROWLEY   3,276,258
MASS FLOWMETERS

Filed Jan. 20, 1964   2 Sheets-Sheet 1

INVENTOR
RICHARD BERTRAM ROWLEY
BY
Mason, Mason & Albright
ATTORNEYS 3,276,258
MASS FLOWMETERS
Richard Bertram Rowley, Rainham, Kent, England, assignor to Elliott Brothers (London) Limited, London, England, a British company
Filed Jan. 20, 1964, Ser. No. 338,789
Claims priority, application Great Britain, Jan. 25, 1963, 3,267/63
6 Claims. (Cl. 73—194)

This invention relates to flowmeters, particularly but not exclusively for measuring the mass flow rate of fuel in aircraft.

Before the introduction of mass flowmeters, the rate of fuel consumption in aircraft, or the flow rate of other fluids, was measured by means of volume flowmeters, but the measurements obtained from these flowmeters required correction for changes in fluid density and temperature.

Mass flowmeters which have been found to represent an improvement over volume flowmeters, can be divided into two main types, namely stator torque meters and rotor torque meters. Stator torque meters measure mass flow in terms of the torque required to annul a known angular momentum of the fluid flow, whilst rotor torque meters, of which British patent specification No. 857,052 describes an example, measure mass flow in terms of the torque required to produce a known angular momentum in the fluid flow. The flow is normally along a duct of circular section; and to the longitudinal component of velocity is added an angular velocity component or whirl about the axis of the duct, and it is the angular momentum associated with this angular component of velocity with which mass flowmeters are particularly concerned.

However, the range of fluid flow over which the early forms of mass flowmeter are accurate is relatively narrow in that in measuring fuel flow rate, their accuracy falls off below 10% of maximum fuel flow rate. With modern aircraft in which the fuel consumption rate on cruising power can be as low as 5% of the fuel consumption rate at full power, a necessary ratio of 64:1 in the amount of fuel used under varying conditions has been found to be desirable.

According to the present invention there is provided a meter for measuring the mass flow rate of a fluid comprising means for imparting an angular velocity, or a change of angular velocity, to the fluid, means for measuring the change of angular momentum of the fluid corresponding to the change in angular velocity, and means operable to increase the change in angular velocity at low mass flow rates.

The present invention also provides a mass flow meter which is operable to measure the mass flow rate of a fluid by effecting a predetermined change in the angular velocity of the fluid flow and measuring the change of angular momentum of the fluid flow corresponding to the change of angular velocity, and having means operable to increase the angular velocity change in response to a decrease in the mass flow rate below a predetermined value.

The present invention further provides a mass flow meter comprising an impeller driven by a motor to impart angular momentum to a fluid flow passing through the meter, a coupling between the impeller and the motor which permits the impeller to lag the motor by an angle dependent upon the imparted angular momentum, means for measuring the time taken for the impeller to rotate through said lag angle and means operable in response to said time falling below a predetermined value to increase the speed of the impeller.

The invention will now be particularly described by way of example, with reference to one construction of rotor torque mass flow meters, in accordance with the invention, for measuring fuel flow rate although the invention is also applicable to stator torque meters. The construction to be described is shown in the accompanying drawings, in which.

The mass flowmeter comprises three main parts, namely a transmitter unit, a computor and an indicator.

Figure 1:
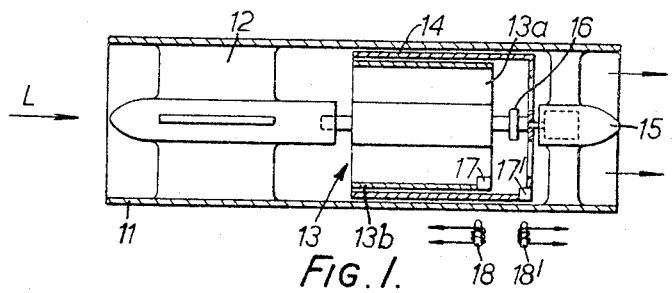
FIGURE 1 is a longitudinal section through a transmitter unit forming part of the mass flowmeter.

The transmitter unit, which is shown in FIGURE 1, comprises a circular section duct 11 into which the fuel flow is directed, stationary vanes 12 being located to extend radially across the inlet end of the duct to straighten the flow, i.e. to ensure that it has substantially no angular velocity.

An impeller 13 for imparting an angular velocity to the fuel flow is mounted downstream of the vanes 12 for rotation about the axis of the duct, and comprises a plurality of vanes 13a surrounded by a cylindrical shroud 13b. Disposed between the shroud 13b and the wall of the duct, is an open-ended drum 14 which is rigidly coupled to a synchronous induction motor 15 to be rotated thereby, whilst the impeller is coupled to the motor 15 through a linear torsion spring 16. Consequently, although both the drum 14 and the impeller 13 are constrained to rotate at the same speed as the motor, the impeller will lag behind the drum by an amount such that the spring exerts a couple sufficient to drive the impeller to impart the angular momentum to the fuel flow, and the angle of lag will therefore provide a measure of this angular momentum.

The relationship between the torque T, mass flow M, angular velocity $\Omega$, the angle of lag $\theta$ and the time $t_0$ taken by the impeller to traverse the angle $\theta$ can be expressed as follows:

(1) $T \alpha M.\Omega$ and
(2) $\theta \alpha M.\Omega$, the spring being linear, (3) $t_0 = \dfrac{\theta}{\Omega}$ or $\theta = t_0 \cdot \Omega$ Consequently, $t_0.\Omega \alpha M.\Omega$ so that $t_0 \alpha M$.

Thus it is seen that the time taken for the impeller to traverse the angle of lag is a measure of the mass flow. This time is measured by mounting one magnetic wafer 17 on the impeller and another 17' on the drum in such a way that they are spaced apart axially, but lie in a common axial plane when the impeller and drum are at rest. Two sensing or pick-off probes 18, 18' are mounted in a common axial plane on the outside of the duct, each in the plane of rotation of its associated wafer. Thus, as the impeller and drum rotate, the passage of each wafer past its associated probe will give rise to a signal pulse and, as the impeller lags behind the drum, so one signal pulse will lag behind the other. Thus, the pick-off probes provide pulses at a repetition frequency depending on the speed of rotation but the time interval between a signal pulse from the drum pick-off probe and the corresponding pulse from the impeller probe depends solely on the mass flow rate. The two associated pulses are fed by means of pulse amplifiers into the bistable switch 27 which produces a square wave time pulse whose leading edge corresponds to the pulse from the drum probe and the trailing edge to that from the impeller probe. The duration of each square wave pulse is compared in a pulse mixer 28 to a predetermined time, as represented by a reference square wave pulse generated by a monostable square wave generator 29 which is triggered by the leading edge of a time pulse from bistable switch 27. Pulse mixer 28 controls a bistable switch 24.

To avoid hunting, i.e. the contacts of switch 24 chattering open and shut repeatedly when the duration is near the predetermined time, it is expedient to arrange that the switch 24 does not re-open until the length of the individual time pulses exceeds a second predetermined time greater than the first predetermined time and to arrange said predetermined time to correspond with an unusual flow rate. For example, aircraft do not usually consume fuel at a rate between 20% and 22½% of the maximum fuel consumption, and the first predetermined value could be at 20% and the second at 22½% of maximum fuel consumption. The operation of the switch in this way at two predetermined values, which is akin to electrical back lash, can be achieved by degrading the edges of the square waves compared in the pulse mixer.

Figure 2:
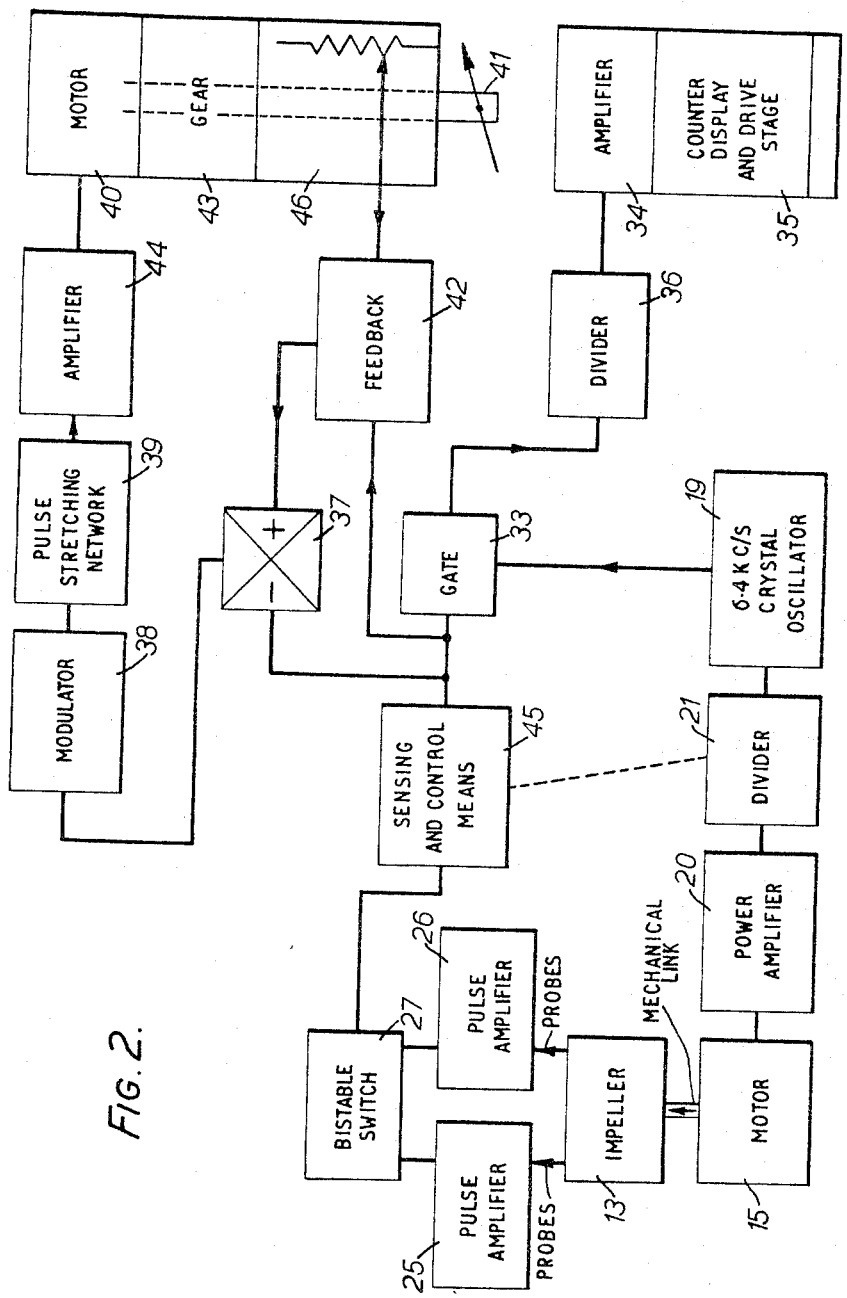
FIGURE 2 is a block diagram of circuitry associated with the transmitter unit.

It will be seen from FIGURE 2 that the motor 15 is driven from a crystal controlled oscillator 19 through a frequency divider network 21 and a power amplifier 20. As shown in greater detail in FIGURE 3, the frequency divider network consists of frequency dividers 22a and 22b, the first of which can be by-passed by means of contacts 23 of the switch 24. In the illustrated embodiments, the oscillator 19 generates a fixed frequency of 6.4 kilocycles per second, and the frequency dividers (a "divide by four" and a "divide by eight" divider) step this down to 200 cycles per second when both are operative, or to 800 cycles per second when the "divide by four" divider is by-passed. Operation of the switch 24 therefore governs whether the motor 15 rotates at low speed or high speed.

Figure 3:
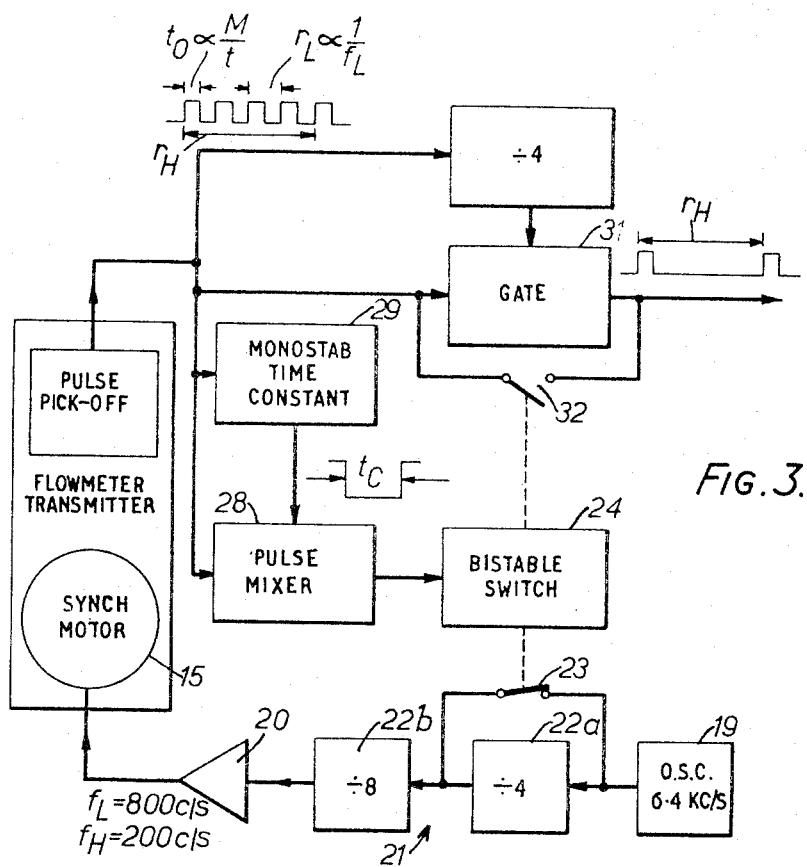
FIGURE 3 shows a block diagram of the circuit of the mass flow meter in its entirety.

The time pulses from switch 27 are also supplied to indicating circuits which are shown in FIGURE 2, but to avoid the repetition frequency of the time pulses affecting these circuits, a "divide by four" gate 31 is provided which passes one pulse in four. This gate is rendered inoperative by contacts 32 of the switch 24 (as can be seen in FIGURE 3), when the motor is running slowly. It will be appreciated that the resultant effect of gate 31 and contacts 32 is to provide an output to the indicating circuits which has a constant repetition frequency.

The time pulses from the switch 27 control a gate 33 for the passage of a train of clock pulses derived from the oscillator 19. The clock pulses are transmitted through an amplifier 34 to a counter 35, the counter 35 having a stage and a suitable display. It will usually be necessary to have a frequency divider 36 to avoid the counter having to cope with high frequencies. This circuit integrates the flow rate to give the quantity which has passed through the meter.

The timing pulses also trigger a square wave generator 42 which provides position feedback pulses whose length is controlled by potentiometer 44 to correspond to the flow rate indicated by a visual output indicator 41. The length of the feedback pulses is compared to the timing pulses in a difference circuit 37 whose output is used to control a suitable modulator 38. The output of the modulator 38 is in the form of pulses which are extended by means of a pulse stretching network 39 to control a servo motor 40 that drives the indicator 41 through a gear box 43, a suitable power amplifier 44 being provided.

Other embodiments of the invention could employ modifications to the described construction. For example, the speed of the motor could be changed by pole changing, e.g. changing the field connections of a dual speed motor, or a construction could be designed using more than two ranges of speed.

Alternatively, with suitable indicating circuitry, it would be feasible to use an infinitely variable motor and possibly to arrange it to produce a constant angular displacement between the impeller and the drum or even a constant time interval.

I claim:
1. A meter for measuring the mass flow rate of a fluid comprising
    means defining a flow path for the fluid,
    an impeller disposed in the flow path to impart an angular velocity about the axis of said flow path to the fluid,
    a motor for driving the impeller,
    a coupling forming a driving connection between the motor and the impeller, which coupling is resilient and allows the impeller to lag the motor by an angle dependent on the angular momentum imparted to the fluid,
    means for measuring the time taken for the impeller to rotate through said angle; and
    means responsive to the measuring means when said time falls below a first predetermined value and operable on the motor to increase the original speed of the impeller directly to a speed which is a multiple of said original speed.

2. A mass flowmeter according to claim 1 wherein said responsive means is also responsive to the measuring means when the time increases beyond a second predetermined value when it is operable on the motor to reduce the original speed of the impeller directly to a speed which is a sub-multiple of said original speed.

3. A mass flowmeter according to claim 1 having
    means for generating an electric pulse for each revolution of the motor, the length of the pulse being a measure of the time taken for the rotor to traverse the angle of lag, and
    means operable during rotation of the impeller at its increased speed to reduce the pulse repetition frequency in proportion to the increase in the speed of the impeller.

4. A meter for measuring the mass flow rate of a fluid comprising
    means defining a flow path for the fluid,
    an impeller disposed in the flow path to impart an angular velocity about the axis of said flow path to the fluid,
    a motor for driving the impeller,
    a coupling forming a driving connection between the motor and the impeller, which coupling is resilient and allows the impeller to lag behind the motor by an angle dependent on the angular momentum imparted to the fluid,
    means for generating an electric pulse for each revolution of the motor, the length of the pulse being a measure of the time taken for the rotor to traverse the angle of lag,
    means, responsive to the length of said pulses, to increase the original speed of the impeller to a value which is a multiple of the original speed of the impeller, and
    means operable during rotation of the impeller at its increased speed to reduce the pulse repetition frequency in proportion to the increase in the speed of the impeller.

5. A mass flowmeter according to claim 4 wherein said pulse-responsive means comprise a bistable switch operable to regulate both the speed of the motor and the pulse repetition frequency.

6. A mass flowmeter according to claim 4 further comprising,
 a gate means operable by the pulse repetition frequency reducing means,
 an oscillator connnected to the gate means so that the gate means passes a train of oscillation when it is operated, and
 a counter responsive to the oscillations passing said gate means to indicate the amount of fuel that has passed.

References Cited by the Examiner

UNITED STATES PATENTS

| | | | |
|---|---|---|---|
| 3,005,341 | 10/1961 | Benson | 73—194 |
| 3,044,294 | 7/1962 | Wilhelm | 73—194 |
| 3,164,017 | 1/1965 | Karlby et al. | 73—194 |

RICHARD C. QUEISSER, *Primary Examiner.*

E. D. GILHOOLY, *Assistant Examiner.*